Jan. 22, 1935.                J. HAFNER                1,988,898
                                SAW
                        Filed Nov. 26, 1932

J. Hafner INVENTOR

By: Marks & Clerk
            Att'ys.

Patented Jan. 22, 1935

1,988,898

UNITED STATES PATENT OFFICE 1,988,898

SAW

Josef Hafner, Balingen, Germany

Application November 26, 1932, Serial No. 644,500
In Germany November 26, 1931

2 Claims. (Cl. 143—141)

This invention relates to improvements in saws and more particularly to circular or veneer saws of the kind adapted for wood-working.

The object of the invention is to provide an improved connection between the blade and the inserted teeth which provides a high degree of strength and rigidity capable of resisting all such strains which result from the high speed of the saw during modern wood-working.

Figure 1:
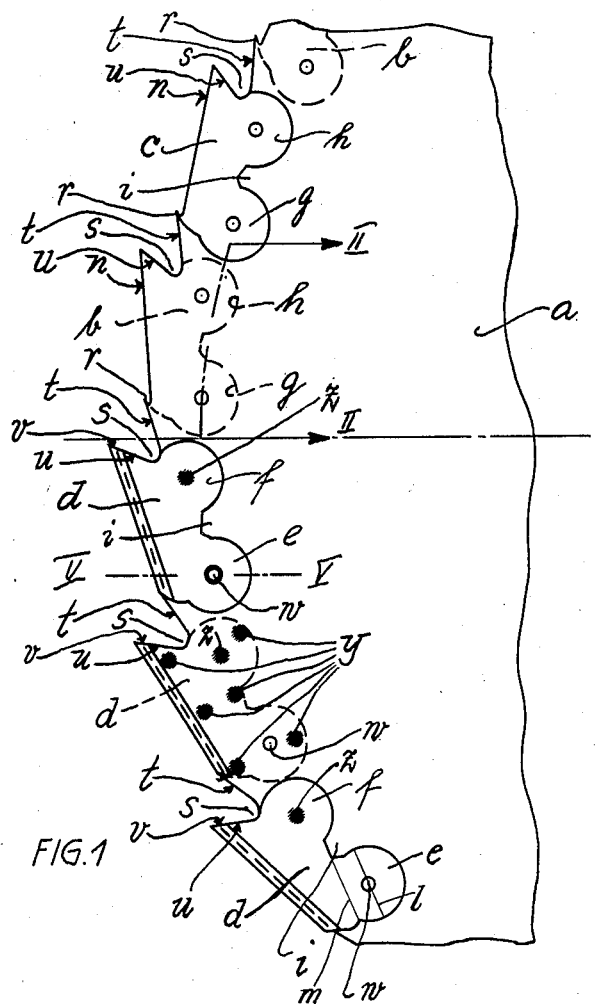
Figure 1 is a partial elevation of a saw constructed in accordance with the invention, the lower portion thereof illustrating several of the teeth in position and the upper part showing the teeth removed.
Figure 2:
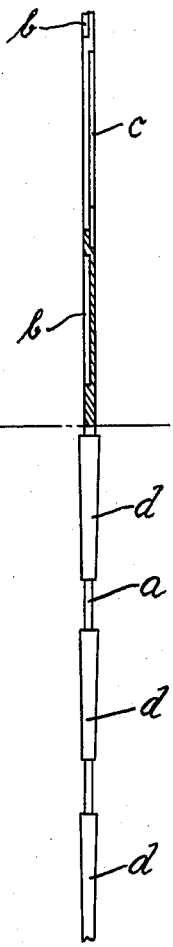
Fig. 2 is an edge view, the lower portion of which is an elevation with the teeth in place and the extreme upper portion showing the blade with the teeth removed, the intermediate portion showing the blade in the plane of the section line II—II of Fig. 1.

Referring to the drawing in detail, the blade $a$ is provided with two series of recesses $b$ and $c$, the recesses constituting sockets for the teeth and one series being formed in one of the lateral faces of the blade $a$ and the other series in the opposite face thereof, the sockets of one series being interspaced with those of the other series.

Each socket receives a saw tooth $d$, the base portion of which is constituted by two spaced and substantially semicircular members $e$ and $f$. The base of each socket is shaped in conformity with the members $e$ and $f$ and for that purpose presents two cavities $g$ and $h$. A projection $i$ is located between the cavities $g$ and $h$ and forms a spur seated in a recess $k$ located between the base members $e$ and $f$.

Figures 3, 4, 5:
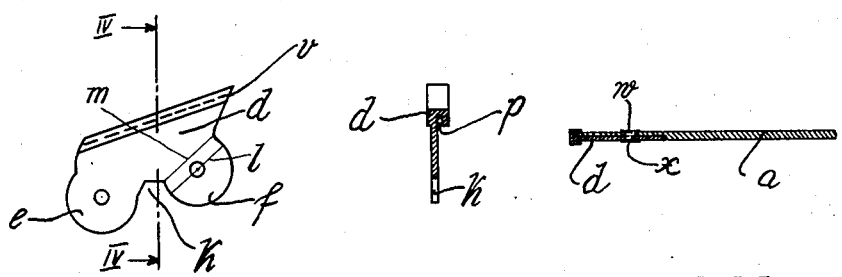
Fig. 3 is a side elevation of a single tooth removed.
Fig. 4 is a transverse section on the line IV—IV of Fig. 3.
Fig. 5 is a partial radial section through the blade and tooth in the plane of the line V—V of Fig. 1.

As clearly shown in Fig. 1 the diameters $l$ of the base members $e$ and $f$ are greater than the width of the throat $m$ of the cavities $g$ and $h$ whereby the base members are firmly held against displacement radially of the blade $a$. As clearly shown in Fig. 5 the base portion of each tooth is of such thickness that it fits snugly into the corresponding socket and the outer surface thereof lies flush with that of the blade $a$.

Each tooth is provided with a strengthening rib extending tangentially along its outer edge and provided on the inner surface with a recess $p$ receiving the portion of the blade $a$ constituting the wall of the socket $b$ or $c$. The forward extremity of the rib constitutes the cutting edge $v$.

The end of each socket $b$ or $c$ opposite the cutting edge $v$ of the tooth is provided with a projection $r$ forming an abutment for the rear end of the tooth so disposed as to withstand the shocks to which the tooth is subjected during its cutting action. A cavity $s$ is provided between each two adjacent sockets, the wall $t$ of which forms a substantial continuation of the outer tooth surface while the wall $u$ thereof is substantially in line with the surface of the cutting edge $v$.

The teeth are rigidly fastened in the sockets by rivets $z$ which are spot-welded and they are additionally anchored in place by additional spot-weldings at the various points designated at $y$. The welding is performed in such a manner that the base of each tooth loses its hardness or temper due to the application of heat whereby it may be more readily filed.

The teeth and the blade are preferably provided with corresponding perforations $w$ constituting passages for air for the purpose of preventing the saw from becoming overheated during use. As suggested in Fig. 5, hollow rivets $x$ may be inserted in the apertures $w$.

I claim:

1. A saw comprising a single main blade having a series of separated lateral sockets extending along each face of the main blade adjacent to the work edge of the blade with the sockets of one series interspaced with the sockets of the other series, a series of teeth mounted in each series of sockets with the teeth of one series interspaced with the teeth of the other series, and an outwardly inclined strengthening rib extending along the outer edge of each tooth and seated on the outer edge of the lateral wall of the adjacent socket, said rib having a cutting edge at its outer end.

2. A saw claimed as in claim 1, characterized by the fact that each tooth-holding socket has its inner wall shaped to provide arcuate segments at each end of the socket and with the arcuate segments separated by a spur projecting from the body part of the blade, and that the tooth is shaped to fit the arcuate segments of the socket, and that the outer edge of the lateral side of the socket is inclined to coincide with the outwardly inclined strengthening rib of the tooth.

JOSEF HAFNER.